(12) United States Patent
Piccinini et al.

(10) Patent No.: US 9,904,538 B2
(45) Date of Patent: Feb. 27, 2018

(54) MAINTENANCE OF MULTI-TENANT SOFTWARE PROGRAMS

(71) Applicant: INTERNATIONAL BUSINESS MACHINES CORPORATION, Armonk, NY (US)

(72) Inventors: Sandro Piccinini, Rome (IT); Riccardo Pizzutilo, Rome (IT); Luigi Pichetti, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 26 days.

(21) Appl. No.: 14/833,323

(22) Filed: Aug. 24, 2015

(65) Prior Publication Data

US 2017/0060569 A1 Mar. 2, 2017

(51) Int. Cl.
*G06F 9/44* (2006.01)
*G06F 9/445* (2018.01)

(52) U.S. Cl.
CPC ..................... *G06F 8/67* (2013.01)

(58) Field of Classification Search
CPC .................................................. G06F 8/65
See application file for complete search history.

(56) References Cited

U.S. PATENT DOCUMENTS

| | | | |
|---|---|---|---|
| 6,681,251 B1 * | 1/2004 | Leymann | H04L 67/1008 709/203 |
| 8,065,560 B1 * | 11/2011 | Patil | G06F 1/329 714/14 |
| 8,650,556 B2 | 2/2014 | McNeill et al. | |
| 8,751,656 B2 | 6/2014 | Cahill et al. | |
| 9,473,472 B1 * | 10/2016 | Zhu | H04L 49/70 |
| 2008/0271017 A1 | 10/2008 | Herington | |

(Continued)

OTHER PUBLICATIONS

Jeswani et al., "Image Elves: Rapid and Reliable System Updates in the Cloud", 2013 IEEE 33rd International Conference on Distributed Computing Systems, IEEE Computer Society, Jul. 8-11, 2013 (pp. 390-399).

(Continued)

*Primary Examiner* — Hang Pan
(74) *Attorney, Agent, or Firm* — Richard Wilhelm; Kevin P. Radigan, Esq.; Heslin, Rothenberg, Farley & Mesiti, P.C.

(57) ABSTRACT

A multi-tenant software program is maintained in a computing environment having a plurality of compatible instances of the program, each adapted to serve a plurality of tenants, with each controlling corresponding individual data. The method includes: receiving a maintenance request for a target instance, the target instance having one or more target tenants each controlling corresponding target individual data; selecting an auxiliary instance from other instances different from the target instance; providing the target individual data of each target tenant to the auxiliary instance; redirecting each target tenant by forwarding each target tenant request to the auxiliary instance; applying a maintenance operation on the target instance according to the maintenance request; returning the target individual data of each target tenant from the auxiliary instance in response to the applying of the maintenance operation; and restoring the serving of each target tenant request by the target instance.

19 Claims, 4 Drawing Sheets

(56) References Cited

U.S. PATENT DOCUMENTS

| | | | |
|---|---|---|---|
| 2010/0162226 A1* | 6/2010 | Borissov | G06F 8/67 717/173 |
| 2010/0211548 A1* | 8/2010 | Ott | G06F 17/30575 707/655 |
| 2012/0102480 A1 | 4/2012 | Hopmann et al. | |
| 2013/0085742 A1* | 4/2013 | Barker | G06F 9/5088 703/22 |
| 2013/0219147 A1 | 8/2013 | Qiang et al. | |
| 2014/0229939 A1 | 8/2014 | Dias deAssuncao et al. | |
| 2014/0376362 A1 | 12/2014 | Selvaraj et al. | |

OTHER PUBLICATIONS

Le et al., "Shadow Patching: Minimizing Maintenance Windows in a Virtualized Enterprise Environment", 2014 10th International Conference on Network and Service Management (CNSM), Nov. 17-21, 2014 (pp. 169-174).

* cited by examiner

MAINTENANCE OF MULTI-TENANT SOFTWARE PROGRAMS

BACKGROUND

The background of the present disclosure is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present disclosure.

The present disclosure relates to the information technology field. More specifically, this disclosure relates to the maintenance of multi-tenant software programs.

Software programs are routinely subject to maintenance operations (after their deployment to a production environment); for example, patches may be applied to correct bugs or upgrades may be applied to improve operation of the software programs from time to time.

However, the performance of the software programs is adversely affected during their maintenance. Indeed, for this purpose the software programs are generally to be put off-line (for example, when a re-booting of corresponding computing machines is required to make the maintenance operations effective); this causes downtimes of the software programs in which they are completely unavailable (commonly referred to as maintenance windows). In any case, the maintenance of the software programs (even when it may be performed on-line) significantly slows down their operation.

When the software programs are of multi-tenant type, any maintenance thereof involves a temporary disruption (or at least a reduction of quality) of the corresponding service. Indeed, in this case each software program is designed to serve multiple users, or tenants, at the same time by each instance thereof; for this purpose, the software program partitions the individual data of the tenants logically, so that each tenant is provided with a virtual software program emulating a dedicated instance thereof. Therefore, during the maintenance of each instance of the software program the service provided to the corresponding tenants is unavailable (or its responsiveness is reduced). The disruption (or low quality) of the service provided by these software programs may be unacceptable in specific computing environments wherein a high availability thereof is required. A typical example is in cloud (computing) environments wherein the software programs are supplied as services, for example, according to a Software-as-a-Service (SaaS) model. In this case, the software programs are made available to their tenants by cloud providers, which provision, configure and release corresponding computing resources upon request (so that their actual implementation is completely opaque thereto). This de-coupling of the cloud services from the actual computing resources that implement them provides the illusion of an infinite capacity thereof and improves their exploitation, especially for high-peak load conditions (by means of economies of scale); moreover, the tenants are now relived of the management of these computing resources (for example, their installation and maintenance), and they may perform tasks (on a pay-per-use basis) that were not feasible previously because of their cost and complexity (especially for individuals and small companies).

In this case, for each (production) computing machine wherein an instance of the (multi-tenant) software program runs, it might be possible to provide a (backup) computing machine that serves its tenants during any maintenance of the instance of the software program in the production computing machine.

However, the backup computing machines involve a corresponding waste of computing resources; moreover, this duplicates the maintenance operations to be performed, with the risk of misalignments among the production computing machines and the backup computing machines.

SUMMARY

In one or more aspects, provided herein is a method for maintaining a multi-tenant software program in a computing environment comprising a plurality of compatible instances of the software program, each compatible instance being adapted to serve a plurality of tenants, and each tenant controlling corresponding individual data. The method includes: receiving a maintenance request for a target instance of the plurality of compatible instances of the software program, the target instance having one or more target tenants, each one controlling corresponding target individual data; selecting, in response to the maintenance request, an auxiliary instance from other instances of the plurality of compatible instances of the software program, the auxiliary instance being different from the target instance; providing the target individual data of each target tenant to be accessible to the auxiliary instance; redirecting each target tenant by forwarding each target tenant request submitted by the target tenant for the target instance to the auxiliary instance, in response to the providing of the target individual data of the target tenant, for causing the auxiliary instance to serve the target tenant request using the corresponding target individual data accessible thereto; applying during the redirecting of the target tenant(s), a maintenance operation on the target instance according to the maintenance request; returning, in response to completion of the applying of the maintenance operation, the target individual data of each target tenant accessible to the target instance from the auxiliary instance; and restoring the serving of each target tenant request by the target instance in response to the returning of the target individual data of the target tenant.

In another aspect, a computer program product is provided for maintaining a multi-tenant software program in a computing environment comprising a plurality of compatible instances of a software program, each compatible instance being adapted to serve a plurality of tenants, and each tenant controlling corresponding individual data. The computer program product includes a computer readable storage medium having computer readable program code embodied therein, the computer readable program code being adapted to perform the following when run on a computer: receiving a maintenance request for a target instance of the plurality of compatible instances of the software program, the target instance having one or more target tenants each one controlling corresponding target individual data; selecting, in response to the maintenance request, an auxiliary instance from other instances of the plurality of compatible instances of the software program, the auxiliary instance being different from the target instance; providing the target individual data of each target tenant to be accessible to the auxiliary instance; redirecting each target tenant by forwarding each target tenant request submitted by the target tenant for the target instance to the auxiliary instance, in response to the providing of the target individual data of the target tenant, for causing the auxiliary instance to serve the target tenant request using the corresponding target individual data accessible thereto; applying, during the redirecting of the target tenant(s), a maintenance operation on the target instance according to the maintenance request; returning, in response to completion of the applying of the maintenance operation, the target individual data of each target tenant accessible to the target instance from the auxiliary instance; and restoring the serving of each target tenant request by the target instance in response to the returning of the target individual data of the target tenant.

In a further aspect, a system is provided for maintaining a multi-tenant software program in a computing environment comprising a plurality of compatible instances of the software program, each compatible instance being adapted to serve a plurality of tenants, and each tenant controlling corresponding individual data. The system includes a memory, and a processing device communicatively coupled to the memory. The system performs a method including: receiving a maintenance request for a target instance of the plurality of compatible instances of the software program, the target instance having one or more target tenants each one controlling corresponding target individual data; selecting in response to the maintenance request, an auxiliary instance from other instances of the plurality of compatible instances of the software program, the auxiliary instance being different from the target instance; providing the target individual data of each target tenant to be accessible to the auxiliary instance; redirecting each target tenant by forwarding each target tenant request submitted by the target tenant for the target instance to the auxiliary instance, in response to the providing of the target individual data of the target tenant, for causing the auxiliary instance to serve the target tenant request using the corresponding target individual data accessible thereto; applying, during the redirecting of the target tenant(s), a maintenance operation on the target instance according to the maintenance request; returning, in response to completion of the applying of the maintenance operation, the target individual data of each target tenant accessible to the target instance from the auxiliary instance; and restoring the serving of each target tenant request by the target instance in response to the returning of the target individual data of the target tenant.

BRIEF DESCRIPTION OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). By way of example.

DETAILED DESCRIPTION

In general terms, the present disclosure is based on the idea of leveraging the different instances of a software program for its maintenance.

Particularly, one or more aspects provide a method for maintaining a multi-tenant software program (in a computing environment comprising a plurality of compatible instances of the software program, each compatible instance being adapted to serve a plurality of tenants, and each tenant controlling corresponding individual data), wherein in response to a maintenance request for a target instance (having one or more target tenants each one controlling corresponding target individual data) an auxiliary instance is selected and a maintenance operation is applied on the target instance while each target tenant request submitted by each target tenant for the target instance is forwarded to the auxiliary instance that serves it on the corresponding target individual data made accessible thereto.

One or more further aspects provide a software program and a software program product for implementing the method.

One or more additional aspects provide a corresponding system.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

Figure 1:
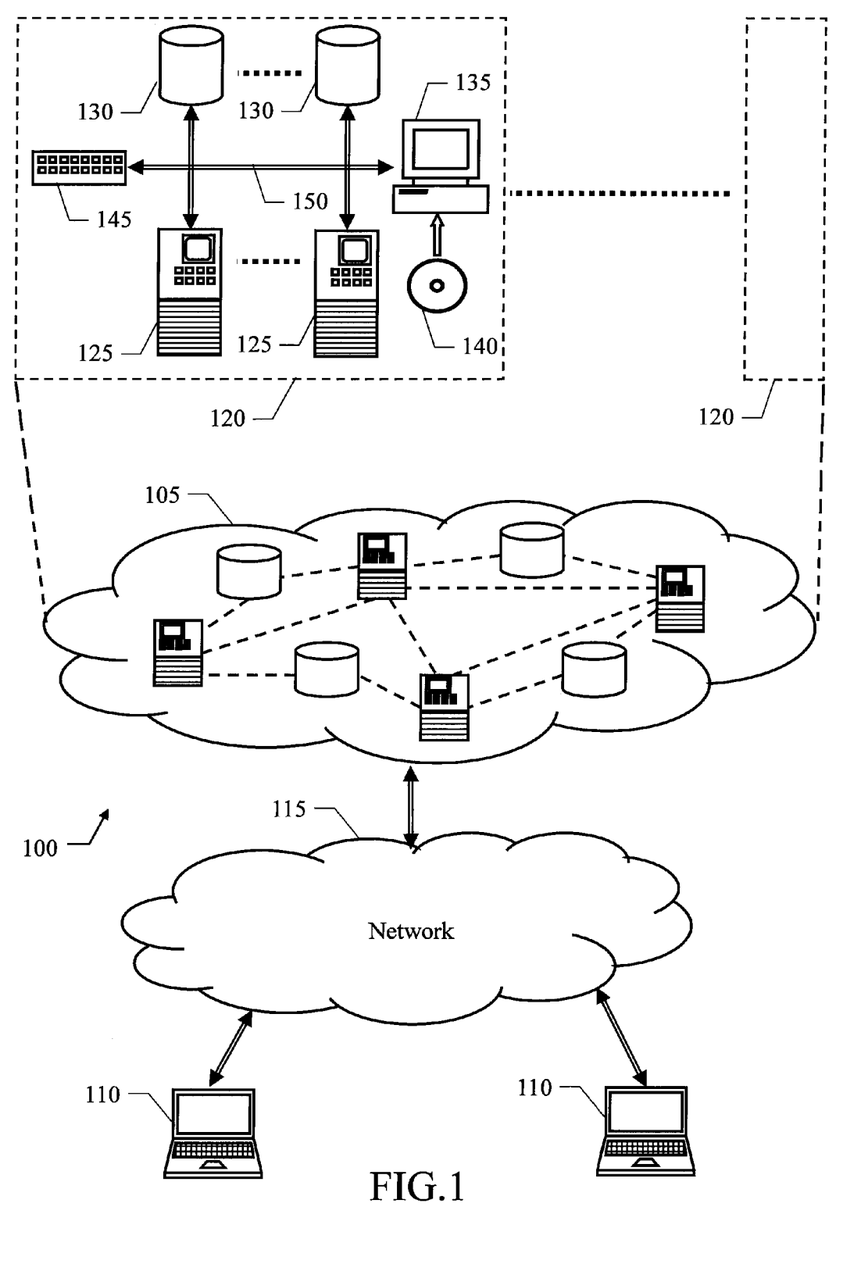
FIG. 1 shows a schematic block-diagram of a computing infrastructure, wherein a solution according to one or more aspects of the present invention may be applied.

With reference in particular to FIG. 1, a schematic block-diagram is shown of a computing infrastructure 100 wherein a solution according to an embodiment of the present disclosure may be applied.

Particularly, the computing infrastructure 100 may be a cloud (computing) infrastructure (supplying cloud services on demand), which may be based on different deployment models, such as public cloud (i.e., for the general public), private cloud (i.e., for a single organization), community cloud (i.e., for several organizations) or hybrid cloud (i.e., based on a combination of different deployment models).

The cloud or computing infrastructure 100 comprises one or more cloud providers 105 (only one shown in the figure). Each cloud provider 105 supplies a pool of (hardware and/or software) computing resources as cloud services (i.e., shared computing resources that may be provisioned, configured and released very rapidly); the computing resources of the cloud services (generally of the virtual type, i.e., emulations by software of physical resources) are supplied upon request to users of the cloud provider 105, so that each user has the sole control of these computing resources (which may then be used exactly as if they were dedicated thereto). The cloud services may be provided according to several service models, particularly, Infrastructure as a Service, or IaaS (providing computing and storage resources with corresponding management software, such as virtual machines, virtual disks with firewalls, load balancers), Platform as a Service, or PaaS (providing software platforms, such as databases, web servers), Software As a Service, or SaaS (providing software applications, such as workload schedulers, office suites), and Network as a Service, or NaaS (providing connectivity services, such as VPNs, IP addresses).

The users connect to the cloud provider 105 with corresponding client computing machines, or simply clients, 110 (for example, of the laptop-type) through a (communication) network 115; for example, the network 115 is the Internet when the cloud environment 100 is a public/community cloud. For this purpose, the cloud provider 105 exposes a front-end component for accessing it (for example, via a web browser of the clients 110); moreover, the cloud provider 105 has a back-end component that actually implements the cloud services (which back-end component is not accessible from the outside, so that the users are completely unaware of its location and configuration).

The cloud provider 105 owns one or more data centers 120. Each data center 120 comprises multiple server computing machines, or simply servers, 125 (for example, of the rack or blade type) and multiple storage disks 130 (for example, of the RAID type) implementing mass-memories thereof; the data center 120 also comprises a console 135 for controlling it (for example, a personal computer, also provided with a drive for reading removable disks 140). A switch/router sub-system 145 manages any communications among the servers 125, the disks 130 and the console 135, and with the network 115; for this purpose, the servers 125, the disks 130 and the console 135 are connected to the switch/router sub-system 145 through a cabling sub-system 150.

Figure 2A:
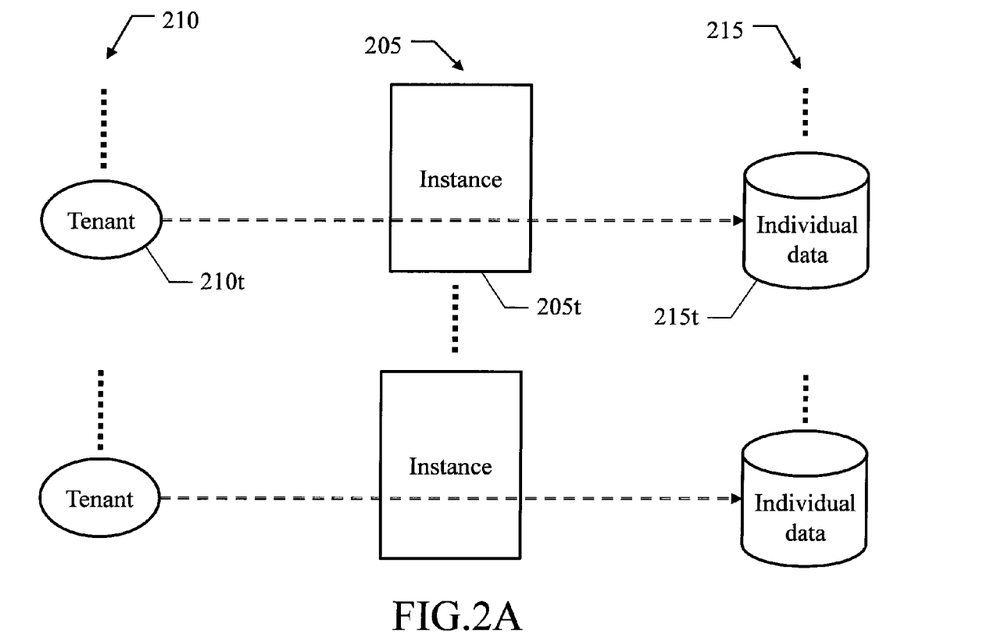
FIGS. 2A-2C show an exemplary application of a solution according to one or more aspects of the present invention.
Figure 2B:
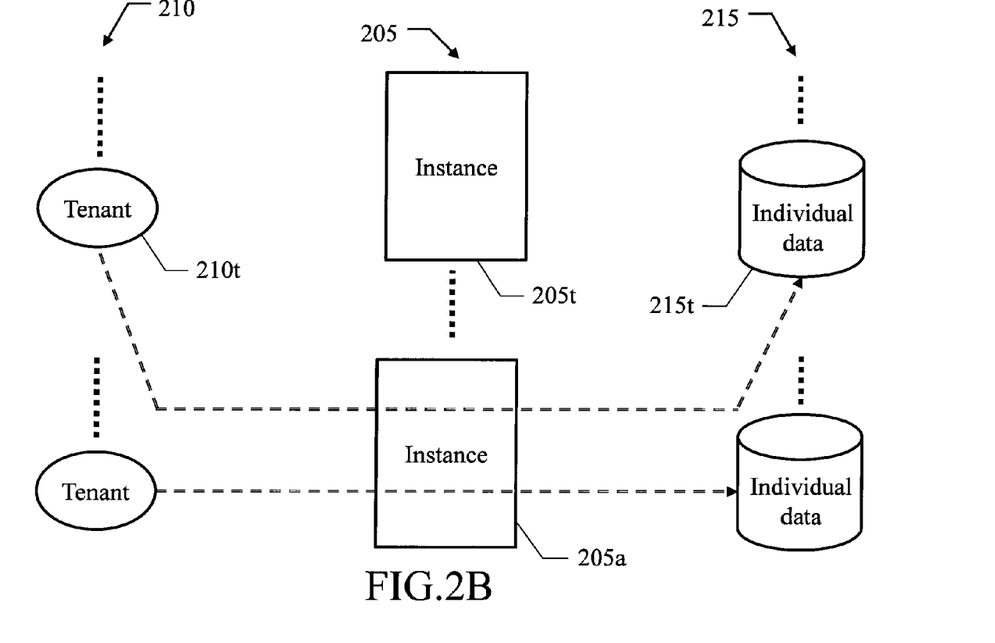
Figure 2C:
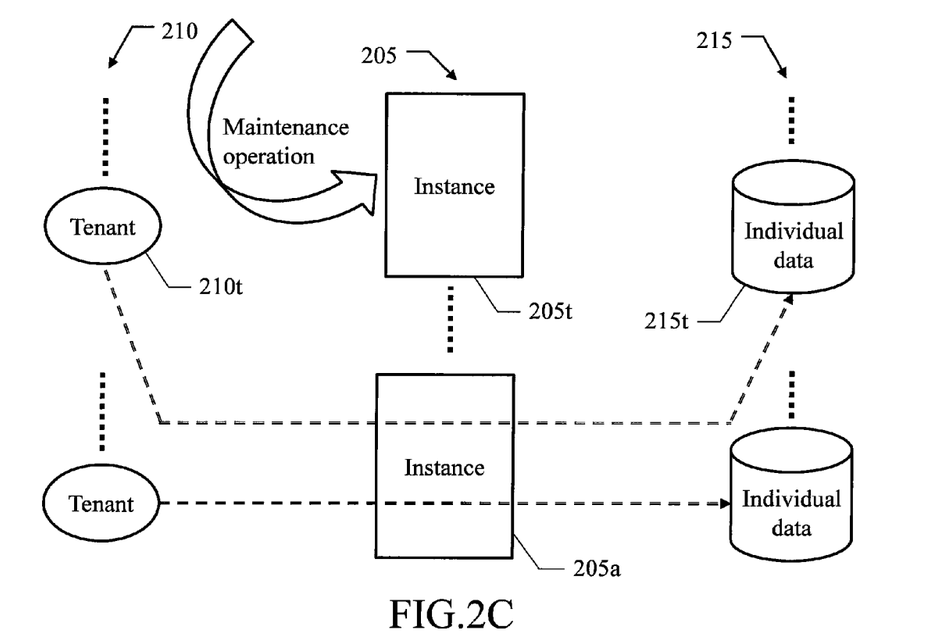

As noted, FIGS. 2A-2C depict an exemplary application is shown of the solution according to an embodiment of the present disclosure.

Starting from FIG. 2A, the cloud provider supplies a multi-tenant software program as a service (for example, according to the SaaS model). For this purpose, the cloud provider runs a plurality of instances 205 of the software program (each one adapted to serve a plurality of tenants). Each instance 205 actually has one or more tenants 210; each tenant 210 controls corresponding individual data 215 (for example, by means of a unique filter assigned thereto). For example, the software program may be a workload scheduler (which is used to control the execution of batch jobs in computing machines of its tenants) and the individual data of each tenant comprises a workload database (storing a definition of its computing machines and jobs) and a control file (storing one or more plans for execution of the jobs in corresponding production periods). A maintenance operation (for example, the application of one or more patches) is to be performed on one of the instances 205, referred to as target instance 205t with its target tenants 210t each one controlling corresponding target individual data 215t.

Passing to FIG. 2B, in the depicted solution, another one of instances 205 different from the target instance 205t, referred to as auxiliary instance 205a, is selected (for example, according to their workload); the auxiliary instance 205a is compatible with the target instance 205t (i.e., the auxiliary instance 205a is capable of serving the target tenants 210t as well, for example, when they are same versions of the software program). The target individual data 215t of each target tenant 210t is made accessible to the auxiliary instance 205a (for example, by cloning it). Each target tenant 210t is now redirected by forwarding each (target) tenant request submitted by the target tenant 210t for the target instance 205t to the auxiliary instance 205a (for causing the auxiliary instance 205a to serve it on the corresponding target individual data 215t that is accessible thereto).

Passing to FIG. 2C, at this point the desired maintenance operation may be applied on the target instance 205t as usual (since it is not on-line any longer). Once the maintenance of the target instance 205t has been completed, the target individual data 215t of each target tenant 210t is returned accessible to the target instance 205t (for example, by merging any updates occurred after its cloning). At this point, the serving is restored of each target tenant request by the target instance on the corresponding target individual data 215t, so as to return to the situation of FIG. 2A (but with the target instance 205t now updated according to the maintenance operation).

With the technique described above, the target tenants do not experience any significant downtime due to the maintenance of their target instance, with the software program that appears substantially always on-line to them (since while the target instance is off-line the target tenants are served by the auxiliary instance on the same target individual data). This improves the availability of the corresponding service (even when each instance of the software program serves corresponding tenants on their individual data being under the control of this instance), substantially avoiding any disruption thereof due to the maintenance of the software program.

The above-described results are achieved by leveraging the instances of the software program that are already available (with a collaborative, or peer-to-peer, approach). Therefore, this does not involve any waste of computing resources; moreover, this avoids duplications of the maintenance operations to be performed, thereby reducing the risk of misalignments of the instances of the software program.

Figure 3:
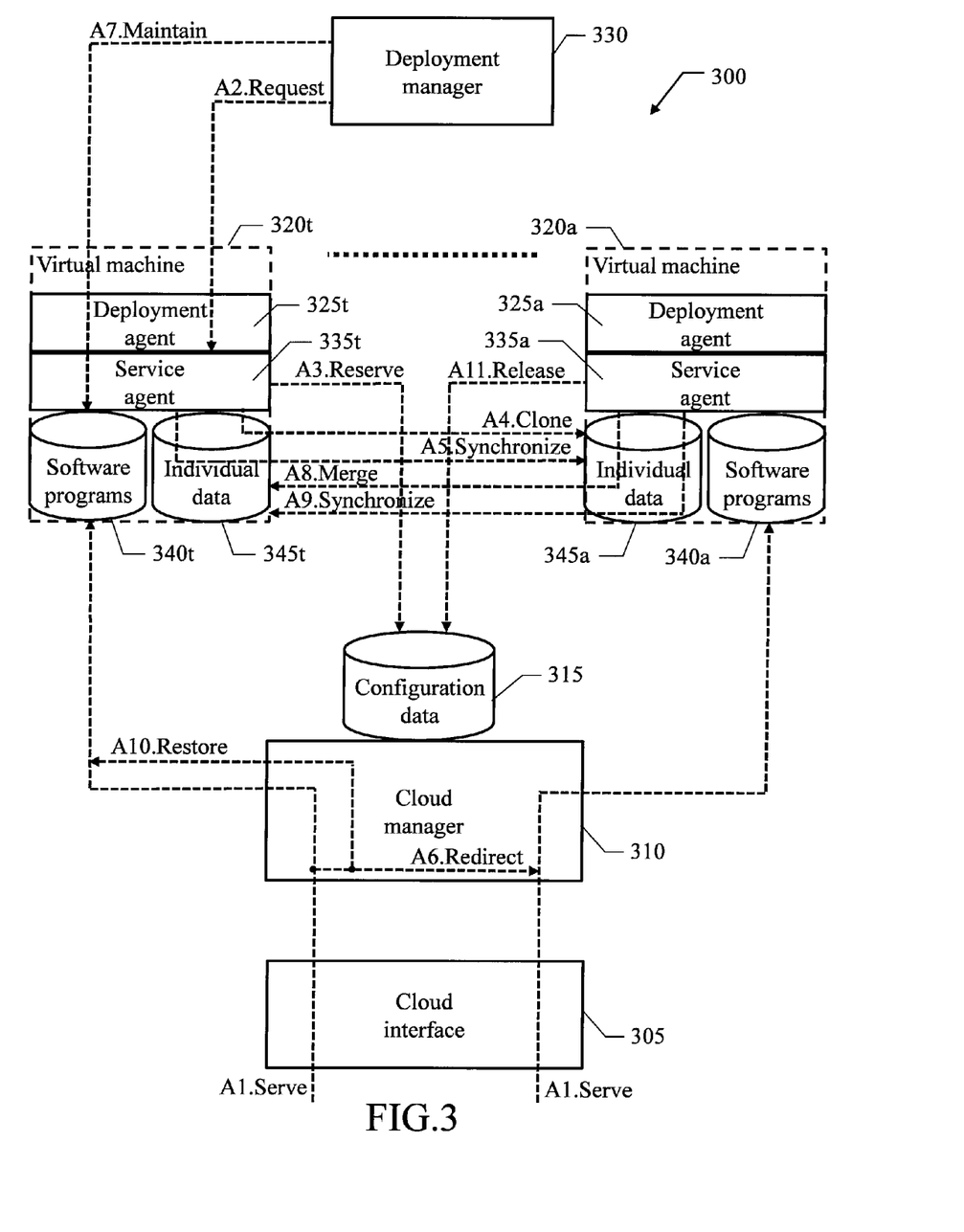
FIG. 3 shows a collaboration diagram representing exemplary roles of main software components that may be used to implement a solution according to one or more aspects of the present invention.

Moving to FIG. 3, a collaboration diagram is shown representing the roles of the main software components that may be used to implement the solution according to one or more aspects of the present invention.

The software components (programs and data) are denoted as a whole with the reference 300. The software components 300 are typically stored in the mass memory and loaded (at least partially) into the working memory of one or more servers of the cloud provider when the programs are running. The programs are initially installed into the mass memory, for example, from removable storage units or from the network. In this respect, each software component may represent a module, segment or portion of code, which comprises one or more executable instructions for implementing the specified logical function. Particularly, the activity diagram describes both the static structure of the software components 300 and their dynamic behavior (by means of a series of exchanged messages, each one representing a corresponding action, denoted with sequence numbers preceded by the symbol "A").

By way of example, a cloud interface 305 may run on one or more (external) servers, or nodes, of the cloud provider; and be used to access the corresponding cloud services by each user of the cloud provider, comprising a multi-tenant software program supplied according to the SaaS model in the example at issue. The cloud interface 305 communicates with a cloud manager 310, running on one or more (internal) servers of the cloud provider (which are not accessible to its users). The cloud manager 310 controls the implementation of the cloud services that are offered to the users of the cloud provider. For this purpose, the cloud manager 310 may control a configuration database 315. The configuration database stores information about the users of the cloud provider and their cloud services; moreover, the configuration database stores information about the computing resources of its data centers and about the implementation of the cloud services thereon. For instance, as far as relevant to aspects of the present invention, the configuration database stores an indication of one or more characteristics of each instance of the multi-tenant software program; for example, the characteristics of each instance comprise its workload (such as the number of tenants that are served) and location (such as the data center wherein the instance is running).

Generally, each cloud service is implemented on a plurality of virtual (computing) machines 320t,320a (i.e., emulation by software of physical computing machines on the internal servers). Each virtual machine 320t,320a comprises a deployment agent 325t,325a (i.e., a software module running continually in the background, which controls the deployment of any software program on the virtual machine 320t,320a (comprising its installation and maintenance). The deployment agents 325t,325a of all the virtual machines 320t,320a communicate with a deployment manager 330 (running on a dedicated virtual machine of the internal servers).

In a solution according to one or more aspects of the present invention, each virtual machine 320t,320a further comprises a service agent 335t,335a. The service agent 335t,335a decouples the software programs installed on the virtual machine 320t,320a from corresponding working data (on which the software programs act to provide the functions for which they have been designed). For this purpose, the software programs are stored in one or more virtual disks 340t,340a (i.e., emulation by software of physical hard disks) of the virtual machine 320t,320a. For instance, the virtual disks 340t,340a store an operation system of the virtual machine 320t,320a and one or more software applications running on top of it (together with corresponding configuration data); in this case, the software applications comprise an instance of the multi-tenant software program at issue. The working data of these software programs is instead stored in one or more different virtual disks 345t, 345a of the virtual machine 320t,320a; in this case, the working data comprises the individual data of each tenant of the corresponding instance of the multi-tenant software program (under the sole control thereof).

Normally, each tenant accesses (with its client) the multi-tenant software program by submitting corresponding (tenant) requests to the cloud interface 305 (for example, to update the definition of its computing machines and jobs in the workload database, to update its plans in the control file, to submit jobs/plans for execution). The cloud interface 305 forwards each tenant request to the cloud manager 310, which in turn dispatches it to the virtual machine 320t,320a wherein the corresponding instance of the multi-tenant software program runs (as indicated in the configuration database 315); each instance of the multi-tenant software program serves each tenant request submitted thereto (generally reading/writing the corresponding individual data) and returns a corresponding (tenant) response to the cloud manager 310, which in turn forwards the tenant response to the cloud interface 305 that returns it to the corresponding tenant. Moreover, in operation each instance of the multi-tenant software program may read/write the individual data of its tenants (for example, to log statistic information relating to executions of the jobs in the workload database and to save information relating to the progress of each plan in the control file) (action "A1.Serve").

Whenever a maintenance operation (for example, to apply one or more patches) has to be performed on a target instance of the multi-tenant software program (with all the entities relating thereto identified by the suffix "t"), the deployment manager 330 sends a corresponding maintenance request to its (target) deployment agent 325t (action "A2.Request"). The corresponding (target) service agent 335t intercepts the maintenance request (for example, by means of hooking techniques). In response thereto, the service agent 335t reserves another instance of the same multi-tenant software program as its auxiliary instance (with all the entities relating thereto identified by the suffix "a").

For this purpose, the service agent 335t submits a corresponding request to the cloud manager 310. In response thereto, the cloud manager 310 extracts (from the configuration database 315) the characteristics of each other instance of the multi-tenant software program that is compatible with the target instance (for example, at the same version) and it is not reserved for the maintenance of other instances (for example, as indicated by a corresponding flag that is deasserted), and it returns them to the service agent 335t. The service agent 335t selects the auxiliary instance among the other instances received from the cloud manager 310 according to one or more selection criteria. For example, this selection may be based on a comparison between the characteristics of the target instance (retrieve directly from it) and the characteristics of these other instances (received from the cloud manager 310). In particular, the selection may depend on the workload of each instance (for example, by giving preference to the instance with the lowest workload that is capable of supporting the additional workload of the target instance) and/or on the distance of the other instances from the target instance (for example, by giving preference to the instance that is the closest to the target instance); for example, a selection index may be calculated for each other instance by weighting values based on the above-mentioned selection criteria (i.e., characteristics and distance with respect to the target instance), with the auxiliary instance that is set to the other instance with the lowest selection index. This limits (down to avoid at all) any side-effect of the switching of the (target) tenants of the target instance to the auxiliary instance during its maintenance. The service agent 335t notifies the cloud manager 310 accordingly, so as to cause it to set the auxiliary instance as reserved in the configuration database 315 (for example, by asserting the corresponding flag) (action "A3.Reserve").

At this point, the service agent 335t may start cloning the target individual data of each target tenant into corresponding (auxiliary) individual data of the target tenant in the auxiliary instance (so as to make the target individual data accessible thereto even when the auxiliary instance and the target instance run in different data centers). For this purpose, the service agent 335t starts intercepting any Input/Output (I/O) operation required by the target instance for reading/writing its target individual data (for example, again by means of hooking techniques). The service agent 335t then implements the I/O operation with a copy-on-write technique. For this purpose, whenever the target instance needs to write a piece of information in the target individual data of any target tenant, the service agent 335t writes this piece of information into a corresponding target cache memory distinct from a memory structure storing the target individual data (so as to leave it unaffected); therefore, whenever the target instance needs to read a piece of information from the target individual data of any target tenant, the service agent 335t reads it from the corresponding target cache memory if available (so as to retrieve its up-to-date version) or from the target individual data otherwise. In this way, the target individual data of each target tenant remains frozen at the start of its cloning. At the same time, the service agent 335t starts listening on the target instance for any (target) tenant request that is received from its target tenants and for any corresponding (target) tenant response that is returned thereto (through the cloud manager 310). In this way, the service agent 335t may trace the progress of any operation that is ongoing in the target instance for each target tenant. At this point, the service agent 335t asks the (auxiliary) service agent 335a of the auxiliary instance to create and mount a new virtual disk 340a in its (auxiliary) virtual machine 320a corresponding to each virtual disk 340t storing the target individual data of each target tenant in the (target) virtual machine 320t (for example, with the same size) and to copy its content (for example, by means of an FTP service). The copy of the target individual data may be performed in the background, while the target instance continues serving the target tenants; however, since the target individual data is not updated any longer after starting its cloning, the target individual data that is copied to the auxiliary instance is equal to a snapshot thereof in the target instance at the moment when its cloning started. Once the copy of this snapshot of the target individual data of each target tenant has been completed, the service agent 335a notifies the service agent 335t accordingly. In response thereto, the service agent 335t writes any piece of information from the target cache memory of this target tenant into the corresponding target individual data (with this piece of information that is then deleted from the target cache memory), and it asks the service agent 335a to do the same on the corresponding auxiliary individual data. As a result, the target cache memory is merged with the corresponding target individual data and auxiliary individual data, so that any update of the target individual data that may have occurred during its copy into the auxiliary individual data is applied to both of them (with the target cache memory that is emptied); in this way, the auxiliary individual data of the target tenant becomes equal to the corresponding target individual data at the moment (action "A4.Clone").

Once the cloning of the target individual data of each target tenant has been completed, if the target tenant has no operation that is ongoing in the target instance (i.e., each target tenant request thereof has received the corresponding target tenant response) it may now be served by the auxiliary instance. Therefore, the service agent 335t forwards any corresponding target tenant request (which may be submitted to the target instance through the cloud manager 310) to the service agent 335a, which in turn submits it to the auxiliary instance. This causes the auxiliary instance to serve the target tenant request on the corresponding auxiliary individual data (as an additional tenant thereof). However, in this case as well the service agent 335a intercepts any I/O operation required by the auxiliary instance for reading/writing the auxiliary individual data of any target tenant and implements it with a copy-on-write technique (so as to write any piece of information into an auxiliary cache memory of the target tenant thereby leaving its auxiliary individual data unaffected); in this way, the auxiliary individual data of each target tenant remains frozen at its creation. Moreover, as above the service agent 335a listens on the auxiliary instance for any target tenant request that is received from the target tenants and for any corresponding target tenant response that is returned thereto, so that the service agent 335a may trace the progress of any operation that is ongoing in the auxiliary instance for each target tenant.

Conversely, if the (pending) target tenant has one or more operations that are still ongoing in the target instance (i.e., corresponding target tenant requests have not received any target tenant responses yet) it continues to be served by the target instance; as above, any piece of information is written into the target cache memory of the pending target tenant (being empty at the beginning) thereby leaving its target individual data unaffected; in this way, the target individual data of the target tenant again remains frozen at the completion of its cloning. As soon as all the ongoing operations of the pending target tenant have been completed (as detected by the target tenant responses to the corresponding target tenant requests), as above the service agent 335t writes any piece of information from the target cache memory of the pending target tenant into the corresponding target individual data (with this piece of information that is then deleted from the target cache memory), and it asks the service agent 335a to do the same on the corresponding auxiliary individual data. As a result, the target cache memory is merged with the corresponding target individual data and auxiliary individual data, so that any update of the target individual data that may have occurred during the completion of the corresponding ongoing operations is applied to both of them; in this way, the auxiliary individual data is synchronized with the actual target individual data in the target instance at the moment (action "A5.Synchronize").

Once all the ongoing operations in the target instance have completed (with no pending target tenant remaining), the service agent 335t asks the cloud manager 310 to redirect any target tenant request to the auxiliary instance, for example, by means of a rerouting service (action "A6.Redirect"). In this way, the switching from the target instance to the auxiliary instant is performed in a seamless way, by maintaining the continuity of the service for the target tenants (on the corresponding target/auxiliary individual data).

The target instance may now be put off-line (since all its target tenants are now served by the auxiliary instance). At this point, the service agent 335t starts listening for any (deployment) response that is returned by the deployment agent 325t to the deployment manager 330. The service agent 335t then forwards the maintenance request (previously intercepted) to the deployment agent 325t, so that the corresponding maintenance operation is applied as usual under the control of the deployment agent 325t; typically, this involves a re-booting (or more) of the virtual machine 320t to make the maintenance effective (action "A7.Maintain").

Once the maintenance operation on the target instance has been completed (as detected by the corresponding deployment response returned by the deployment agent 325t to the deployment manager 330), the service agent 335t instructs the service agent 335a to start merging the auxiliary individual data of each target tenant with the corresponding target individual data (in the target instance). For this purpose, the service agent 335a (in the background, while the auxiliary instance continues serving the target tenants) writes any piece of information from the auxiliary cache memory of each target tenant into the corresponding auxiliary individual data (with this piece of information that is then deleted from the auxiliary cache memory), and it asks the service agent 335t to do the same on the corresponding target individual data. As a result, the auxiliary cache memory is merged with the corresponding auxiliary individual data and target individual data, so that any update of the auxiliary individual data that may have occurred during the serving of the target tenant by the auxiliary instance is applied to both of them (with the auxiliary cache memory that is emptied); in this way, the auxiliary individual data of the target tenant at the moment is returned to the target instance (action "A8.Merge").

Once the merging of the auxiliary individual data of each target tenant has been completed, if the target tenant has no operation that is ongoing in the auxiliary instance it may be served back by the target instance. Therefore, the service agent 335a forwards any corresponding target tenant request to the service agent 335t, which in turn submits it to the target instance (which serves it as usual on its target individual data). Conversely, if the (pending) target tenant that has one or more operations that are still ongoing in the auxiliary instance it continues to be served by the auxiliary instance; as above, any piece of information is written into the auxiliary cache memory of the pending target tenant (being empty at the beginning) thereby leaving its auxiliary individual data again unaffected (frozen at the completion of its merging with the corresponding target individual data). As soon as all the ongoing operations of the pending target tenant have been completed, the service agent $335a$ asks the service agent $335t$ to write any piece of information from the auxiliary cache memory of the pending target tenant into the corresponding target individual data (with this piece of information that is then deleted from the auxiliary cache memory). As a result, the auxiliary cache memory is merged with the target individual data, so that any update of the auxiliary individual data that may have occurred during the completion of the corresponding ongoing operations is applied to its target individual data; in this way, the target individual data is synchronized with the actual auxiliary individual data at the moment (action "A9. Synchronize").

Once all the ongoing operations in the auxiliary instance have completed (with no pending target tenant remaining), the service agent $335a$ asks the cloud manager $310$ to remove the redirection of the target tenant requests to the auxiliary instance (for example, by stopping the corresponding rerouting service) so as to restore their normal serving by the target instance, now suitably updated (action "A10.Restore"). The service agent $335a$ stops intercepting the I/O operations of the auxiliary instance and listening on it; the service agent $335a$ then dismounts and releases the virtual disks $340a$ of the virtual machine $320a$ that were used to store the auxiliary individual data. At this point, the service agent $335a$ notifies the cloud manager $315$ that all the operations involved by the maintenance of the target instance have been completed, so as to cause it to set the auxiliary instance as released for next maintenance operations (for example, by deasserting the corresponding flag) (action "A11.Release").

Naturally, in order to satisfy local and specific requirements, a person skilled in the art may apply many logical and/or physical modifications and alterations to the concepts disclosed herein. More specifically, although this disclosure has been presented with a certain degree of particularity with reference to one or more embodiments thereof, it should be understood that various omissions, substitutions and changes in the form and details as well as other embodiments are possible. For instance, different embodiments of the present disclosure may even be practiced without specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, one or more embodiments provide a method for maintaining a multi-tenant software program. The maintenance may be of any type (for example, for improving performance, ensuring compatibilities with new execution environments, removing security vulnerabilities, deleting obsolete functions) and it may be applied to any software program (for example, a performance monitor, a load balancer).

In one or more embodiments, the methods disclosed herein may be applied in a computing environment comprising a plurality of compatible instances of the software program. However, the computing environment may be of any type (see below) and it may comprise any number and type of compatible instances of the software programs (for example, higher versions/releases with backward compatibility).

In one or more embodiments, each instance is adapted to serve a plurality of tenants each one controlling corresponding individual data. However, each instance may serve any number and type of tenants (for example, persons, companies, other software programs); and each tenant may control any type of individual data (for example, monitoring reports) stored in any way (for example, in one or more dedicated files).

In one or more embodiments, the methods disclosed herein may comprise receiving a maintenance request for a target instance of the instances of the software program (with the target instance that has one or more target tenants each one controlling corresponding target individual data). However, the maintenance request may be of any type (for example, a downgrading) and it may be provided in any way to any maintenance module, even not running in the background (for example, by simply launching a corresponding installer).

In one or more embodiments, the methods may comprise selecting an auxiliary instance of the other instances of the software program different from the target instance in response to the maintenance request. However, the auxiliary instance may be selected in any way (see below).

In one or more embodiments, the methods may comprise providing the target individual data of each target tenant accessible to the auxiliary instance. However, the target individual data may be made accessible to the auxiliary instance in any way (see below).

In one or more embodiments, the methods may comprise redirecting each target tenant by forwarding each target tenant request (submitted by the target tenant for the target instance) to the auxiliary instance in response to the providing of the target individual data of the target tenant; this causes the auxiliary instance to serve the target tenant request on the corresponding target individual data that is accessible thereto. However, the target tenant request may be of any type (for example, for setting user preferences, requesting reports) and it may be forwarded in any way (for example, by putting the virtual machine of the target instance off-line and adding an alias therefor to the virtual machine of the auxiliary instance).

In one or more embodiments, the methods may comprise applying a maintenance operation on the target instance according to the maintenance request in response to the redirecting for all the target tenants. However, the maintenance operation may be applied in any way (for example, with or without any re-booting of the corresponding virtual machine, possibly followed by a verification of its result).

In one or more embodiments, the methods may comprise returning the target individual data of each target tenant accessible to the target instance from the auxiliary instance in response to the applying of the maintenance operation. However, the target individual data may be returned accessible to the target instance in any way (see below).

In one or more embodiments, the methods may comprise restoring the serving of each target tenant request by the target instance in response to the returning of the target individual data of the target tenant. However, the serving of the target tenant requests may be restored in any way (for example, by removing the alias for the corresponding virtual machine and putting it on-line).

In one or more embodiments, the methods may comprise providing the target individual data of each target tenant may comprise cloning the target individual data of the target tenant into corresponding auxiliary individual data of the target tenant in the auxiliary instance. However, the cloning may be implemented in any way (see below); in any case, the possibility of providing the target individual data to the auxiliary instance in different ways is not excluded (for example, by mounting the corresponding virtual disk(s) of the target instance, such as in read mode only, by the virtual machine of the auxiliary instance when they run in the same data center).

In one or more embodiments, the cloning the target individual data of the target tenant may comprise copying a snapshot of the target individual data of the target tenant into the corresponding auxiliary individual data. However, the snapshot may be copied in any way (for example, at the bit level or at the file level).

In one or more embodiments, the cloning the target individual data of the target tenant may comprise (in response to a completion of the copying of the snapshot of the target individual data of the target tenant) applying each update of the target individual data of the target tenant occurred in the target instance during the copying thereof to the corresponding auxiliary individual data. However, the updates may be applied to the auxiliary individual data in any way (even without the use of any cache memory, for example, by logging the corresponding I/O operations).

In one or more embodiments, the cloning the target individual data of the target tenant may comprise (in response to the completion of the copying of the snapshot of the target individual data of the target tenant) applying each update of the target individual data of the target tenant occurred in the target instance during the copying thereof to the target individual data of the target tenant. However, the updates may be applied to the target individual data in any way as above; in any case, the possibility of performing this operation later on (for example, when the auxiliary individual data is merged back with the target individual data is not excluded).

In one or more embodiments, the providing the target individual data of each target tenant may comprise (in response to a completion of the cloning of the target individual data of the target tenant) serving each target tenant request of each target tenant by the target instance when the target tenant has one or more operations being ongoing in the target instance or forwarding the target tenant request to the auxiliary instance for causing the auxiliary instance to serve the target tenant request on the corresponding auxiliary individual data otherwise. However, the target tenant requests may be forwarded in any way (for example, by a rerouting service like during the maintenance of the target instance); in any case, the possibility of serving all the target tenants by the target instance until all of them may be served by the auxiliary instance is not excluded.

In one or more embodiments, the providing the target individual data of each target tenant may comprise applying each update of the target individual data of the target tenant occurred in the target instance after the cloning thereof to the corresponding auxiliary individual data in response to a completion of all the ongoing operations of the target tenant. However, these updates as well may be applied to the auxiliary individual data in any way (see above); in any case, the possibility of providing the target individual data to the auxiliary instance in different ways is not excluded (for example, by synchronizing the auxiliary individual data only after all the corresponding ongoing operations in the target instance have been completed).

In one or more embodiments, the providing the target individual data of each target tenant may comprise applying each update of the target individual data of the target tenant occurred in the target instance after the cloning thereof to the target individual data of the target tenant in response to the completion of all the ongoing operations of the target tenant. However, the updates may be applied to the target individual data in any way as above; in any case, the possibility of performing this operation later on (for example, after all the corresponding ongoing operations in the target instance have been completed or even when the auxiliary individual data is merged back with the target individual data) is not excluded.

In one or more embodiments, the returning the target individual data of each target tenant may comprise merging the auxiliary individual data of the target tenant with the corresponding target individual data by applying each update of the auxiliary individual data of the target tenant occurred in the auxiliary instance after the redirecting of the target tenant to the corresponding target individual data. However, the updates may be applied to the target individual data in any way as above; in any case, the possibility is not excluded of allowing the auxiliary instance to update the auxiliary individual data and then copying it back to the target instance (for example, with differential techniques).

In one or more embodiments, the returning the target individual data of each target tenant may comprise (in response to a completion of the merging of the target individual data of the target tenant) serving each target tenant request of each target tenant by the auxiliary instance when the target tenant has one or more further operations being ongoing in the auxiliary instance or forwarding the target tenant request to the target instance for causing the target instance to serve the target tenant request on the corresponding target individual data otherwise. However, in this case as well the target tenant requests may be forwarded in any way (see above) and the possibility of serving all the target tenants by the auxiliary instance until all of them may be served back by the target instance is not excluded.

In one or more embodiments, the returning the target individual data of each target tenant may comprise applying each update of the auxiliary individual data of the target tenant occurred in the auxiliary instance after the merging thereof to the corresponding target individual data in response to a completion of all the further ongoing operations of the target tenant. However, in this case as well these updates may be applied to the target individual data in any way (see above) and the possibility of returning the auxiliary individual data to the target instance in different ways is not excluded (for example, by synchronizing the target individual data only after all the ongoing operations in the auxiliary instance have been completed).

In one or more embodiments, the selecting an auxiliary instance may comprise selecting the auxiliary instance according to one or more characteristics of each instance of the software program. However, the characteristics of the instances may be in any number and of any type (see below); in any case, the selection of the auxiliary instance may be performed in any way, either centrally or in a completely distributed way (even independently of the characteristics of the instances, for example, with a round robin policy).

In one or more embodiments, the selecting an auxiliary instance may comprise selecting the auxiliary instance according to a workload of each instance of the software program and/or according to a distance between the target instance and each one of the other instances of the software program. However, the workload may be defined in any way (for example, according to a residual processing power of the corresponding virtual machine) and the distance may be defined in any way (for example, based on a corresponding transmission time); in any case, different, additional or alternative characteristics may be taken into account (for example, applicable service levels).

In one or more embodiments, the selecting an auxiliary instance may comprise reserving the auxiliary instance for the target instance (with the auxiliary instance that is then selected among the other instances of the software programs that are not reserved); said restoring the serving of each tenant request comprises releasing the auxiliary instance for the selection. However, the auxiliary instance may be reserved and released in any way (for example, with each instance that denies a corresponding request from the target instance directly when it is already busy); however, the possibility of having a single auxiliary instance operating at the same time for two or more target instances is not excluded.

In one or more embodiments, each instance of the software program may be installed in at least one first storage device and the individual data of the corresponding tenants is stored in at least one second storage device. However, the storage devices may be in any number and of any type (for example, solid state memories); in any case, the possibility of having each instance of the software program and the corresponding individual data mixed in the same storage device(s) is not excluded.

In one or more embodiments, the computing environment may be a cloud computing environment and the software program is supplied as a service in the cloud computing environment. However, the software program may be supplied in any cloud computing environment (for example, of private or hybrid type) and according to any other service model (for example, IaaS, PaaS or NaaS); in any case, the possibility of applying the same technique to any other multi-tenant software program (for example, implemented in a classic client-server environment) is not excluded.

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

In one or more aspects, a computer program is provided configured for causing a computing system to perform the above-mentioned method when the computer program is executed on the computing system. One or more embodiments provide a computer program product for maintaining a multi-tenant software program, the computer program product comprising a computer readable storage medium having program instructions embodied therewith, the program instructions executable by a computing system to cause it to perform the same method. However, the computer program may be implemented as a stand-alone module, as a plug-in for a pre-existing software program (for example, a deployment agent), or even directly in the latter; in any case, the software program may comprise any number of modules in any position (for example, distributed on the computing machines wherein the instances of the software program are installed and/or centralized in a control computing machine such as in association with the cloud manager).

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more embodiments may comprise a system comprising means configured for performing the steps of the above-mentioned method. In particular, one or more embodiments may comprise a system for maintaining a multi-tenant software program in a computing environment comprising a plurality of compatible instances of the software program each one adapted to serve a plurality of tenants each one controlling corresponding individual data. The system comprises a service agent for receiving a maintenance request for a target instance of the instances of the software program, the target instance having one or more target tenants each one controlling corresponding target individual data, for selecting an auxiliary instance of the other instances of the software program different from the target instance in response to the maintenance request, for providing the target individual data of each target tenant accessible to the auxiliary instance and for redirecting each target tenant by forwarding each target tenant request submitted by the target tenant for the target instance to the auxiliary instance in response to the providing of the target individual data of the target tenant for causing the auxiliary instance to serve the target tenant request on the corresponding target individual data being accessible thereto. The system comprises a maintenance module for applying a maintenance operation on the target instance according to the maintenance request in response to the redirecting for all the target tenants. The service agent is further adapted to return the target individual data of each target tenant accessible to the target instance from the auxiliary instance in response to the applying of the maintenance operation and to restore the serving of each target tenant request by the target instance in response to the returning of the target individual data of the target tenant.

Generally, similar considerations apply if the system has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

What is claimed is:

1. A method for maintaining a multi-tenant software program in a computing environment comprising a plurality of virtual machines with a plurality of compatible instances of the software program, each compatible instance being adapted to serve a plurality of tenants, and each tenant controlling corresponding individual data, the method comprising:

receiving a maintenance request at a target virtual machine for a target instance of the plurality of compatible instances of the software program, the target instance having one or more target tenants each one controlling corresponding target individual data;

selecting by a target service agent of the target virtual machine, in response to the maintenance request, an auxiliary instance from other instances of the plurality of compatible instances of the software program, the auxiliary instance being associated with an other virtual machine of the plurality of virtual machines different from the target virtual machine with the target instance, and the other virtual machine comprising an auxiliary service agent;

providing, by the target service agent of the target virtual machine, the target individual data of each target tenant to be accessible to the auxiliary instance of the other virtual machine, wherein the providing comprises cloning the target individual data of each target tenant into corresponding auxiliary individual data of the target tenant in the auxiliary instance, the cloning being performed, in part, by communications between the target service agent and the auxiliary service agent;

initiating redirecting, by the target service agent of the target virtual machine, each target tenant by forwarding each target tenant request submitted by the target tenant for the target instance to the auxiliary service agent of the other virtual machine with the auxiliary instance, in response to the providing of the target individual data of the target tenant, for causing the auxiliary instance to serve the target tenant request using the auxiliary individual data of the target tenant;

applying, during the redirecting of the target tenant(s), a maintenance operation on the target instance according to the maintenance request;

initiating returning by the target service agent, in response to completion of the applying of the maintenance operation, the target individual data of each target tenant, wherein the returning comprises merging the auxiliary individual data of the target tenant with the corresponding target individual data, the merging performed in part by communications between the target service agent and the auxiliary service agent, and including applying to the corresponding target individual data each update of the auxiliary individual data of the target tenant that occurred in the auxiliary instance after the redirecting of the target tenant; and restoring the serving of each target tenant request by the target instance in response to the returning of the target individual data of the target tenant.

2. The method of claim 1, wherein the cloning the target individual data of the target tenant comprising:
copying a snapshot of the target individual data of the target tenant into the corresponding auxiliary individual data.

3. The method of claim 2, wherein the cloning the target individual data of the target tenant comprises, in response to a completion of the copying of the snapshot of the target individual data of the target tenant:
applying to the corresponding auxiliary individual data each update of the target individual data of the target tenant that occurred in the target instance during the copying thereof.

4. The method of claim 3, wherein the cloning the target individual data of the target tenant comprises, in response to the completion of the copying of the snapshot of the target individual data of the target tenant:
applying to the target individual data of the target tenant each update of the target individual data of the target tenant that occurred in the target instance during the copying thereof.

5. The method of claim 2, wherein the providing the target individual data of each target tenant comprises, in response to a completion of the cloning of the target individual data of the target tenant:
serving each target tenant request of each target tenant by the target instance when the target tenant has one or more operations being ongoing in the target instance or forwarding the target tenant request to the auxiliary instance for causing the auxiliary instance to serve the target tenant request on the corresponding auxiliary individual data otherwise, and applying each update of the target individual data of the target tenant that occurred in the target instance after the cloning thereof to the corresponding auxiliary individual data in response to a completion of ongoing operations of the target tenant.

6. The method of claim 5, wherein the providing the target individual data of each target tenant comprises:
applying each update of the target individual data of the target tenant that occurred in the target instance after the cloning thereof to the target individual data of the target tenant in response to the completion of the ongoing operations of the target tenant.

7. The method of claim 1, wherein the returning the target individual data of each target tenant comprises, in response to a completion of the merging of the target individual data of the target tenant:
serving each target tenant request of each target tenant by the auxiliary instance when the target tenant has one or more further operations ongoing in the auxiliary instance or forwarding the target tenant request to the target instance for causing the target instance to serve the target tenant request on the corresponding target individual data; and applying, in response to a completion of ongoing operations of the target tenant, each update of the auxiliary individual data of the target tenant that occurred in the auxiliary instance after the merging thereof to the corresponding target individual data.

8. The method of claim 1, wherein the selecting an auxiliary instance comprises:
selecting the auxiliary instance according to one or more characteristics of each instance of the plurality of instance of software program.

9. The method of claim 8, wherein the selecting the auxiliary instance comprises:
selecting the auxiliary instance according to a workload of each instance of the plurality of instances of the software program or according to a distance between the target instance and each one of the other instances of the plurality of compatible instances of the software program.

10. The method of claim 1, wherein the selecting an auxiliary instance comprises:
reserving the auxiliary instance for the target instance, the auxiliary instance being selected among other instances of the plurality of compatible instances of the software program not already reserved; and wherein the restoring the serving of each tenant request comprises:
releasing the auxiliary instance for other selection.

11. The method of claim 1, wherein each instance of the software program is installed in at least one first storage device and the individual data of the corresponding tenants is stored in at least one second storage device.

12. The method of claim 1, wherein the computing environment is a cloud computing environment and the software program is supplied as a service in the cloud computing environment.

13. A computer program product for maintaining a multi-tenant software program in a computing environment comprising a plurality of virtual machines with a plurality of compatible instances of a software program, each compatible instance being adapted to serve a plurality of tenants, and each tenant controlling corresponding individual data, the computer program product comprising:
- a computer-readable storage medium having computer-readable program code embodied therein, the computer-readable program code being adapted to perform the following when run on a computer:
  - receiving a maintenance request at a target virtual machine for a target instance of the plurality of compatible instances of the software program, the target instance having one or more target tenants each one controlling corresponding target individual data;
  - selecting by a target service agent of the target virtual machine, in response to the maintenance request, an auxiliary instance from other instances of the plurality of compatible instances of the software program, the auxiliary instance being associated with an other virtual machine of the plurality of virtual machines different from the target virtual machine with the target instance, and the other virtual machine comprising an auxiliary service agent;
  - providing, by the target service agent of the target virtual machine, the target individual data of each target tenant to be accessible to the auxiliary instance of the other virtual machine, wherein the providing comprises cloning the target individual data of each target tenant into corresponding auxiliary individual data of the target tenant in the auxiliary instance, the cloning being performed, in part, by communications between the target service agent and the auxiliary service agent;
  - initiating redirecting, by the target service agent of the target virtual machine, each target tenant by forwarding each target tenant request submitted by the target tenant for the target instance to the auxiliary service agent of the other virtual machine with the auxiliary instance, in response to the providing of the target individual data of the target tenant, for causing the auxiliary instance to serve the target tenant request using the auxiliary individual data of the target tenant;
  - applying, during the redirecting of the target tenant(s), a maintenance operation on the target instance according to the maintenance request;
  - initiating returning by the target service agent, in response to completion of the applying of the maintenance operation, the target individual data of each target tenant, wherein the returning comprises merging the auxiliary individual data of the target tenant with the corresponding target individual data, the merging performed in part by communications between the target service agent and the auxiliary service agent, and including applying to the corresponding target individual data each update of the auxiliary individual data of the target tenant that occurred in the auxiliary instance after the redirecting of the target tenant; and
  - restoring the serving of each target tenant request by the target instance in response to the returning of the target individual data of the target tenant.

14. The computer program product of claim 13, wherein the cloning the target individual data of the target tenant comprising:
- copying a snapshot of the target individual data of the target tenant into the corresponding auxiliary individual data.

15. The computer program product of claim 14, wherein the cloning the target individual data of the target tenant comprises, in response to a completion of the copying of the snapshot of the target individual data of the target tenant:
- applying to the corresponding auxiliary individual data each update of the target individual data of the target tenant that occurred in the target instance during the copying thereof.

16. The computer program product of claim 15, wherein the cloning the target individual data of the target tenant comprises, in response to the completion of the copying of the snapshot of the target individual data of the target tenant:
- applying to the target individual data of the target tenant each update of the target individual data of the target tenant that occurred in the target instance during the copying thereof.

17. A system for maintaining a multi-tenant software program in a computing environment comprising a plurality of virtual machines with a plurality of compatible instances of the software program, each compatible instance being adapted to serve a plurality of tenants, and each tenant controlling corresponding individual data, the system comprising:
- a memory; and
- a processing device communicatively coupled to the memory, wherein the system performs a method comprising:
  - receiving a maintenance request at a target virtual machine for a target instance of the plurality of compatible instances of the software program, the target instance having one or more target tenants each one controlling corresponding target individual data;
  - selecting by a target service agent of the target virtual machine, in response to the maintenance request, an auxiliary instance from other instances of the plurality of compatible instances of the software program, the auxiliary instance being associated with an other virtual machine of the plurality of virtual machines different from the target virtual machine with the target instance, and the other virtual machine comprising an auxiliary service agent;
  - providing, by the target service agent of the target virtual machine, the target individual data of each target tenant to be accessible to the auxiliary instance of the other virtual machine, wherein the providing comprises cloning the target individual data of each target tenant into corresponding auxiliary individual data of the target tenant in the auxiliary instance, the cloning being performed, in part, by communications between the target service agent and the auxiliary service agent;
  - initiating redirecting, by the target service agent of the target virtual machine, each target tenant by forwarding each target tenant request submitted by the target tenant for the target instance to the auxiliary service agent of the other virtual machine with the auxiliary instance, in response to the providing of the target individual data of the target tenant, for causing the auxiliary instance to serve the target tenant request using the auxiliary individual data of the target tenant;
  - applying, during the redirecting of the target tenant(s), a maintenance operation on the target instance according to the maintenance request;
  - initiating returning by the target service agent, in response to completion of the applying of the maintenance operation, the target individual data of each target tenant, wherein the returning comprises merging the auxiliary individual data of the target tenant with the corresponding target individual data, the merging performed in part by communications between the target service agent and the auxiliary service agent, and including applying to the corresponding target individual data each update of the auxiliary individual data of the target tenant that occurred in the auxiliary instance after the redirecting of the target tenant; and restoring the serving of each target tenant request by the target instance in response to the returning of the target individual data of the target tenant.

18. The system of claim 17, wherein the cloning the target individual data of the target tenant comprising:

copying a snapshot of the target individual data of the target tenant into the corresponding auxiliary individual data.

19. The system of claim 18, wherein the cloning the target individual data of the target tenant comprises, in response to a completion of the copying of the snapshot of the target individual data of the target tenant:

applying to the corresponding auxiliary individual data each update of the target individual data of the target tenant that occurred in the target instance during the copying thereof.

* * * * *